Oct. 21, 1952 — R. W. BERRY — 2,614,592
EGG SEPARATOR WITH THUMB OPERABLE YOLK TRAP
Filed May 7, 1949
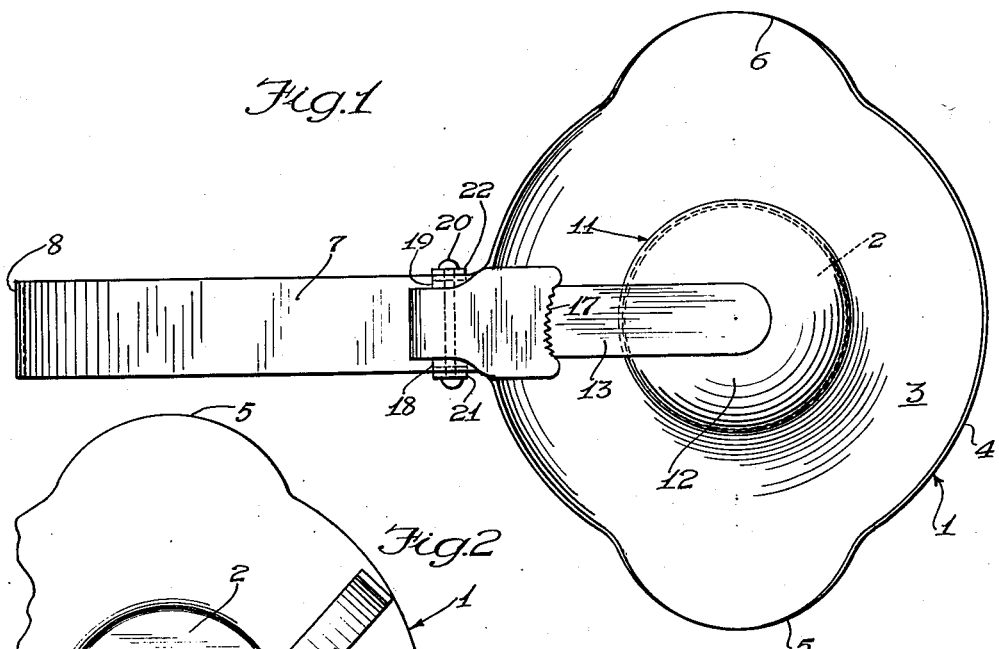
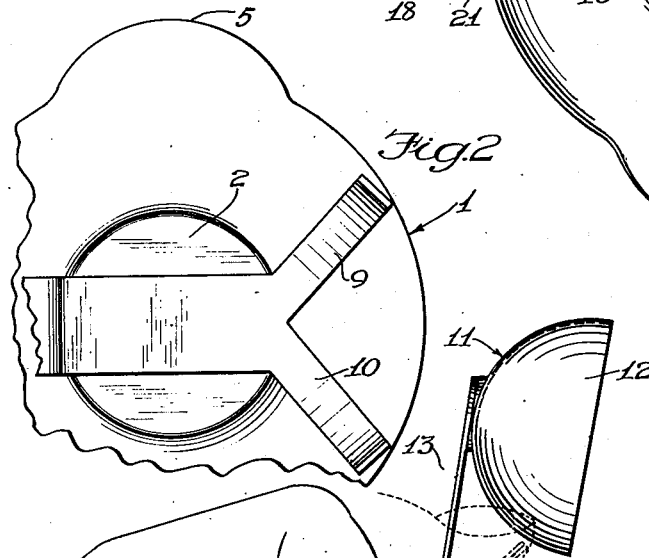
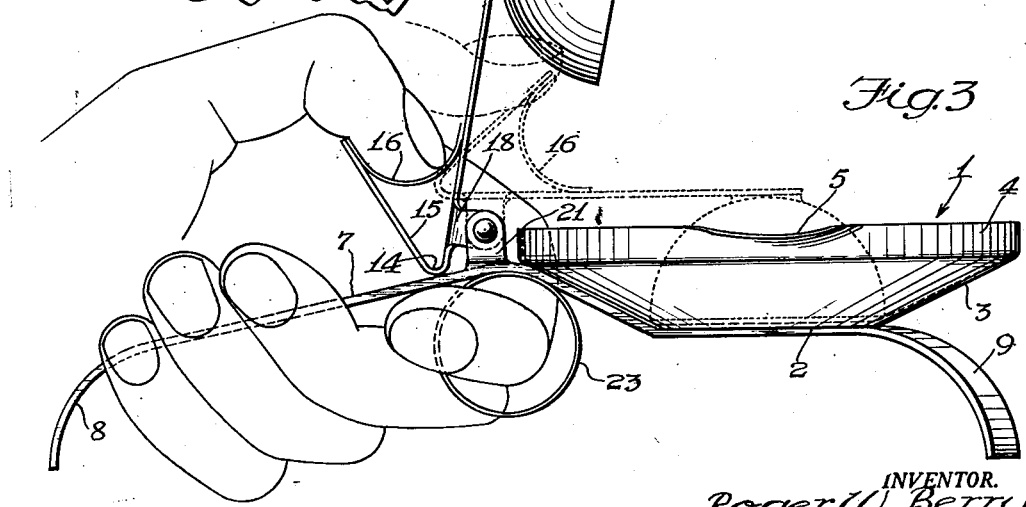
INVENTOR.
Roger W. Berry
BY Theodore W. Miller
Attorney Patented Oct. 21, 1952

2,614,592

UNITED STATES PATENT OFFICE 2,614,592

EGG SEPARATOR WITH THUMB OPERABLE YOLK TRAP

Roger W. Berry, Princeton, Ill.

Application May 7, 1949, Serial No. 92,036

1 Claim. (Cl. 146—2)

This invention relates to egg separators in general for separating the yolk from the white of an egg and vice versa, and more particularly to the hand operated type for domestic use.

Egg separators have been proposed heretofore both power operated and hand operated, but they have usually been of the slow drip type and none have provided a means for positively separating the white from the yolk, and vice versa, simply, rapidly and efficiently.

The primary object of this invention is accordingly to provide an egg separator embodying such a means.

Another important object of this invention is to provide such a separator which may be simply and conveniently operated by hand.

A further and important object of this invention is to provide a separator of the type referred to which is simple of construction and may be cheaply and economically manufactured.

A still further object is to provide such a separator which may be conveniently stored.

Other and further objects of this invention will become more apparent hereinafter as the same becomes better understood from an examination of the specification and claim in conjunction with the accompanying drawings wherein:

Fig. 1 represents a plan view of a manually operable egg separator in closed position embodying this invention.

Fig. 2 is a fragmentary bottom plan view of same; and

Fig. 3 is a longitudinal side view of the separator in open position.

Referring to the drawings more particularly, reference character 1 represents generally a saucer-like sheet metal receptacle which receives the contents of the egg directly from the egg shell. This receptacle or saucer has a flat circular center 2 surrounded by an annular sloping portion 3 leading thereto from slightly raised sides 4 which merge into pouring lips 5 and 6. The lips 5 and 6 are diametrically opposed and on an axis perpendicular to a curved sheet metal handle 7 welded to the bottom of the saucer or receptacle 1 and extending radially therefrom. The handle 7 has a downwardly curved outer end portion which acts as one leg 8 for the separator, said handle being split at its other or inner end to provide a pair of angularly spaced radially extending integral downwardly curved legs 9 and 10, which legs act to hold the receptacle 1 level when the same is placed on the kitchen table.

A yolk trap generally designated 11 comprising a hollow semi-spherical sheet metal cup 12 of a diameter slightly larger than the center 2 is welded to the upper (viewing Fig. 3) end of a sheet metal arm 13. The arm 13 has an integral extension on its other end bent to form an abutment 14, an angular portion 15 and a U-shaped thumb seat 16. The juncture between the portion 15 and the seat 16 is cut to provide a transverse serrated second U-shaped thumb seat 17.

The arm 13 is provided with a pair of integral flanged extensions 18 and 19 which are apertured to receive a pivot pin 20 mounted in a pair of upwardly extending flanged supporting members 21 and 22 integrally formed on the handle 7.

A sheet metal loop 23 is welded to the underside of the handle 7 to receive the forefinger of an operator.

In operation the separator is placed on the table and both the egg white and yolk are dropped directly from the shell into the saucer-like receptacle 1 with the yolk trap 12 in an open position. Using only one hand, either right or left, the tip of the thumb is then placed in the U-shaped thumb seat 16, then the first joint of the fore-finger into the loop 23 beneath the saucer 1 with the rest of the fingers pressed lightly beneath the handle 7. The thumb is then straightened which brings the second thumb seat 17 beneath the sole of the thumb which permits complete control of the yolk trap in either the lowering or raising operation. The yolk being heavier than the white, settles to the center of the saucer where it is trapped by lowering the yolk trap. The operator then picks up the separator, still holding the yolk trap pressed against the saucer bottom, pours off the white, then raises the yolk trap and drops the yolk separately. This entire operation is performed with only one hand. The viscosity of egg white tends to cause a clinging which is overcome by shaking the last of the white off the saucer much as one would shake a serving from a spoon.

The center of gravity of the yolk trap 11 is such that it will remain in the open position shown in Fig. 3 when level. This eliminates the need for a spring to hold it open which would interfere with storage.

Other advantages of the afore-described separator will be apparent without further detail. It is distinctly not the slow drip variety but instead one that separates the white from the yolk simply, rapidly and efficiently.

I am aware that many changes may be made and details varied without departing from the principles of my invention and I therefore do not wish to be limited to the details shown or described.

I claim:

In a device of the character described, a receptacle for a raw egg, means for trapping the yolk therein, a handle for lifting said receptacle said means being provided with a hinged support and a portion connected with said support recessed to receive the thumb of an operator of the same hand that operates the handle, said recessed portion having depressed serrated edge adapted to engage the edge of said thumb when the latter is extended to enable the hinged support to be actuated to lower the yolk-trapping means to operative position and to enable said thumb to raise said support and yolk-trapping means to inoperative position by contracting the position of said thumb.

ROGER W. BERRY.

REFERENCES CITED

The following references are of record in the file of this patent:

UNITED STATES PATENTS

| Number | Name | Date |
|---|---|---|
| 990,758 | Lewis | Apr. 25, 1911 |
| 1,744,665 | Neubert | Jan. 21, 1930 |
| 1,759,512 | Kramer et al. | May 20, 1930 |
| 2,507,500 | Chester | May 16, 1950 |